US012694458B2

(12) United States Patent
Forrest et al.

(10) Patent No.: US 12,694,458 B2
(45) Date of Patent: Jul. 28, 2026

(54) SYSTEM AND METHOD FOR ARTIFICIAL INTELLIGENCE ISSUE SPOTTING

(71) Applicant: Quest For Justice, LLC, Las Vegas, NV (US)

(72) Inventors: Patrick Forrest, Arlington, VA (US); Binh Dang, Las Vegas, NV (US)

(73) Assignee: QUEST FOR JUSTICE, LLC, Las Vegas, NV (US)

( * ) Notice: Subject to any disclaimer, the term of this patent is extended or adjusted under 35 U.S.C. 154(b) by 194 days.

(21) Appl. No.: 18/334,142

(22) Filed: Jun. 13, 2023

(65) Prior Publication Data

US 2024/0420260 A1 Dec. 19, 2024

(51) Int. Cl.
*G06Q 50/18* (2012.01)

(52) U.S. Cl.
CPC .......... *G06Q 50/18* (2013.01); *G06Q 50/182* (2013.01)

(58) Field of Classification Search
None
See application file for complete search history.

(56) References Cited

U.S. PATENT DOCUMENTS

| | | | |
|---|---|---|---|
| 11,010,848 B1 * | 5/2021 | Colucci ............... | G06Q 50/182 |
| 2006/0195430 A1 * | 8/2006 | Arumainayagam ... | G06Q 10/10 |
| 2016/0140210 A1 * | 5/2016 | Pendyala .............. | G06F 40/205 |
| | | | 707/737 |
| 2019/0236478 A1 * | 8/2019 | Wu ......................... | G06N 20/00 |
| 2021/0109958 A1 * | 4/2021 | Behtash ................ | G06F 18/214 |

* cited by examiner

*Primary Examiner* — George Chen
(74) *Attorney, Agent, or Firm* — Venable LLP; Ryan T. Ward

(57) ABSTRACT

Systems, methods, and computer-readable storage media for issue spotting in legal cases, and more specifically to training and using an Artificial Intelligence (AI) model to identify possible causes of action in a legal dispute. A system can receive a plurality of cause of action models, and tune an existing AI model using the plurality of action models, resulting in a tuned AI model. The system can then convert the tuned AI model into an AI algorithm, where inputs to the AI algorithm include a jurisdiction and at least one piece of dispute information associated with the dispute, and outputs of the AI algorithm include a cause of action for the dispute and elements of the cause of action.

20 Claims, 5 Drawing Sheets

SYSTEM AND METHOD FOR ARTIFICIAL INTELLIGENCE ISSUE SPOTTING

BACKGROUND

1. Technical Field

The present disclosure relates to issue spotting in legal disputes, and more specifically to training and using an Artificial Intelligence (AI) model to identify possible causes of action in a legal dispute.

2. Introduction

A cause of action is a legally recognized wrong. Laws, rules, regulations, case law, etc. helps the court identify what is a cause of action and what is not. When one entity sues another, the suing entity needs to prove that one or more causes of action exist. They do so by providing timelines, evidence, information about the parties, and other facts of a case.

Issue spotting occurs when an entity uses facts to identify potential causes of action for one entity against another entity. Traditionally, issue spotting has required the use of an attorney to review the facts, identify the relevant law, and determine the likelihood of success in convincing a court/jury that their interpretation of the law is correct. However, for entities which are unable to afford an attorney, and which must attempt pro se representation, issue spotting and identifying possible causes of action represents a substantial hurdle to equal access to justice.

SUMMARY

Additional features and advantages of the disclosure will be set forth in the description that follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media which provide a technical solution to the technical problem described. A method for performing the concepts disclosed herein can include: receiving, at a computer system, a plurality of cause of action models; tuning, via at least one processor of the computer system, an existing artificial intelligence (AI) model using the plurality of cause of action models, resulting in a tuned AI model; and converting, via the at least one processor, the tuned AI model into an AI algorithm, wherein: input to the AI algorithm comprises a jurisdiction and at least one piece of dispute information associated with a dispute; and output of the AI algorithm comprises a cause of action for the dispute and elements of the cause of action.

A system configured to perform the concepts disclosed herein can include: at least one processor; and a non-transitory computer-readable storage medium having instructions stored which, when executed by the at least one processor, cause the at least one processor to perform operations comprising: receiving a plurality of cause of action models; tuning an existing artificial intelligence (AI) model using the plurality of cause of action models, resulting in a tuned AI model; and converting the tuned AI model into an AI algorithm, wherein: input to the AI algorithm comprises a jurisdiction and at least one piece of dispute information associated with a dispute; and output of the AI algorithm comprises a cause of action for the dispute and elements of the cause of action.

A non-transitory computer-readable storage medium configured as disclosed herein can have instructions stored which, when executed by at least one processor, cause the at least one processor to perform operations which include: receiving a plurality of cause of action models; tuning an existing artificial intelligence (AI) model using the plurality of cause of action models, resulting in a tuned AI model; and converting the tuned AI model into an AI algorithm, wherein: input to the AI algorithm comprises a jurisdiction and at least one piece of dispute information associated with a dispute; and output of the AI algorithm comprises a cause of action for the dispute and elements of the cause of action.

DETAILED DESCRIPTION

Figure 1:
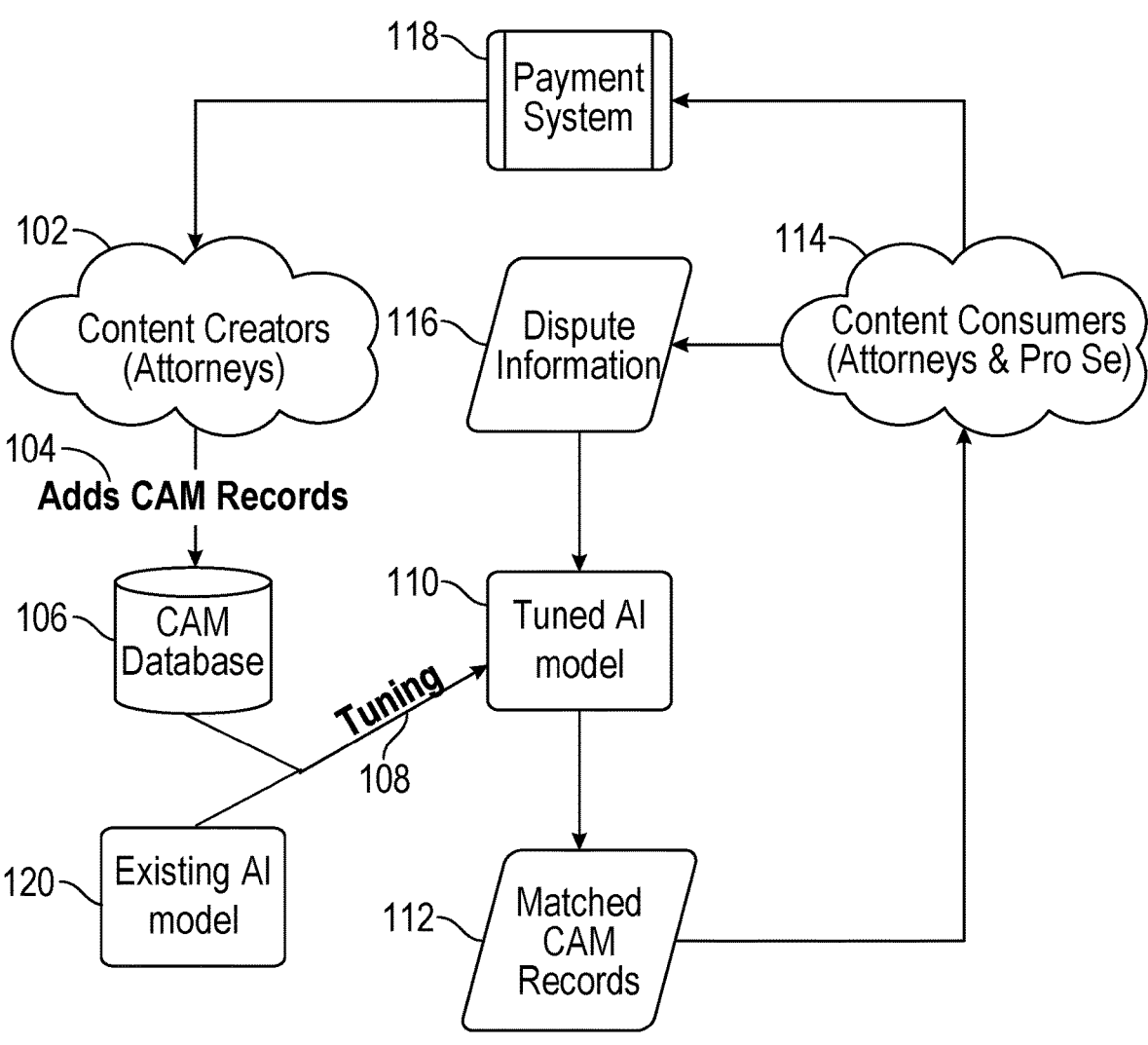
FIG. 1 illustrates an example of creating Cause of Action Models (CAM), tuning an AI model based on those models, and executing the tuned AI model using dispute information.

Various embodiments of the disclosure are described in detail below. While specific implementations are described, this is done for illustration purposes only. Other components and configurations may be used without parting from the spirit and scope of the disclosure.

To protect their legal rights, or the rights of their clients, court users (both litigants and attorneys) need to identify the fact(s) that a court would grant a judgment on. These facts are used to prove the existence of a cause of action.

Court users can turn to statutes, case laws, and jury instructions as information sources to learn about the different causes of action that are under a court's jurisdiction. These documents are stored in books or computer systems. If the documents are stored in computer systems, then they can be searched via a table of contents search, an index search, or a keyword search.

While such search technology can be used by a sophisticated user to search through millions of documents quickly, it does require the user to know what keywords to look for. These keywords are concepts not typically known by a layperson. For example, while a layperson may think about a business loss in moral terms such as "theft" the legal term in civil law is "conversion." A user would need to have some knowledge of legal terms to effectively use keyword search technology.

Even legal professionals, who do know the legal terms, can still miss things when searching for one or more possible causes of action. Before such legal professionals search for something, they would need to have an idea as to what it is they are looking for. For example, if the case is complicated and/or there are a lot of documents, then the legal professionals may miss something in their search. Anything that is missed means that such information may not be used in the legal research process to identify additional causes of action to be pursued in court, which in turn means that the clients of those legal professionals would not have all their legal rights protected.

Systems configured as disclosed herein can use artificial intelligence (AI) technology to match information/facts about a dispute with legal rights information, with the result being that the system can provide information about cause(s) of action that could be applicable to the dispute. Consider the following example. An individual (who is not an attorney) is moving from their apartment and, despite a detailed cleaning of the apartment before vacating and no damage to the apartment, the landlord is refusing to return the individual's deposit. If the individual were an attorney, or able to afford an attorney, the individual may be able to identify such a situation as a breach of contract legal claim. However, in this example, the individual cannot afford an attorney, and despite knowing that they deserve their deposit, are unaware of the proof required by a court to obtain that deserved deposit.

Using the system disclosed herein, that individual can provide facts about the dispute to a computer system, and based on those facts the computer system can identify a cause of action (in this case breach of contract). The computer system can also provide the legal elements of such a cause of action which would need to be proved in order for the cause to be affirmatively decided (e.g., proof of a contract, proof of the individual's obligations under the contract, proof of failure of the landlord to fulfill obligations under the contract, and damages suffered). In some configurations, the computer system may also provide examples of past cases (both precedential and/or non-precedential cases) which used the identified cause of action.

To do so, systems configured as disclosed herein use Artificial Intelligence (AI) technology to match the dispute facts/information with legal rights information, causing the system to retrieve information about cause(s) of action that could be applicable to the dispute. Whereas previous search technology allows a user to conduct a search use statutes and previous cases, systems configured as disclosed herein are trained using training data such as (but not limited to) the statutes, jury instructions, and/or past cases (precedential or otherwise) where judges have identified the cause of action in their judgments. When using the past cases as training data, the system can identify correlations between evidence/facts of a past case, the related cause of action, and the ultimate judgment (that is a correlation between the evidence and the cause of action, a correlation between the evidence and the judgment, and/or a correlation between the cause of action and the judgment). Whereas previous search technology relied on a user (e.g., litigants or attorneys) to figure out what keywords to search under, systems configured as disclosed herein can eliminate that step entirely, instead relying on inputs such as evidence/facts. In essence, the user of this system will need to have less existing legal knowledge.

Because the laws/causes of action can vary from location to location, the user can also input a location or jurisdiction into the system, allowing the system to identify which laws, precedent cases, etc., apply to a given dispute. For example, if the user is having a dispute in New Mexico, upon receiving the location information the system can retrieve and provide information regarding causes of action solely for New Mexico, rather than retrieving information from other jurisdictions.

Likewise, in some disputes the user characteristics of an entity or individual may be pertinent to certain causes of action. For example, if a business were accused of selling tobacco products to underage individuals, the age of the individuals would be an important aspect to any associated cause of action. Likewise, user characteristics can include information regarding different types of businesses. For example, the type of legal entity (e.g., S-Corp, an individual, an LLC, or other type of corporation) could impact court jurisdiction, venue, certain defenses and/or causes of action (for example, some procedural defenses, such as statute of limitations, may have limits based on the type of entity; likewise certain jurisdictions may provide or limit the availability of a statutorily created cause of action for a professional service organization)

Likewise, the system can use information such as the number of cases filed by an entity within a given period of time, and the amount of damages sought in those other cases. Such information can impact a given court's jurisdiction. For example, in California small claims court natural persons (i.e., individuals) can claim up to $10,000. Corporations, partnerships, unincorporated associations, governmental bodies, and other legal entities cannot claim more than $5,000. Also, no claimant (natural person or legal entity) may file more than two small claims court actions for more than $2.500 anywhere in the state during any calendar year.

In some instances, the system can use user characteristics directed to an individual's mental state, such as in instances where mens rea is used both in criminal cases and as an element to prove awareness or intentionality in civil cases. For example, a person does not violate the False Claims Act (FCA) by submitting a false claim to the government; to violate the FCA a person must have submitted, or caused the submission of, the false claim (or made a false statement or record) with knowledge of the falsity. Knowledge of false information is defined as being (1) actual knowledge, (2) deliberate ignorance of the truth or falsity of the information, or (3) reckless disregard of the truth or falsity of the information. If a fact is entered which shows or implies knowing that the fact is false, then this characteristic would impact the cause of action output by the system.

Training of the AI model (or tuning an existing AI model) can be performed using labeled data referred to as a Cause of Action Model (CAM). A CAM is a data record having one or more of:

1) A name of the cause of action (e.g., Breach of Contract, Fraud, Negligence, Dissolution of Marriage, etc.);
2) A relevant jurisdiction;
3) A source of law (e.g., law, regulation, case law, etc.);
4) A description of the cause of action (e.g., A breach of contract occurs when at least one party violates the terms of the contract resulting in damages to the other party (ies);
5) The legal elements that must be proven as being true for the cause of action to be true;
6) Judgment text of precedent cases that is the basis for the cause of action;
7) Judgment text of non-precedential cases where the cause of action was applied by a court. (e.g., small claims court cases, family court cases, etc.);
8) Jury instructions created by courts for the cause of action; and/or
9) Defenses (e.g., procedural, affirmative, and/or statutory);

Each CAM can be prepared automatically using an algorithm which first receives a list of causes of action (e.g., a list of tort causes of action, a list of contractual causes of action, and/or other causes of action). The algorithm can then perform an online search within a single jurisdiction for the law(s) associated with that cause of action, how the cause of action is defined within that jurisdiction, legal elements of the cause of action, jury instructions for the cause of action, and/or cases associated with the cause of action. Alternatively, a CAM can be prepared by an attorney, legal professional, or other interested party who is familiar with the cause of action. In this manner, multiple CAMs can be created and used by the system to train the AI to identify different causes of action. This means there is a higher chance of a positive match between an aspect of the input data with one or more CAMs by the AI.

In configurations where each CAM is created/labeled by a human user, the CAMs may be created by attorneys (or other individuals), and the system can keep a record of the identity of the attorney/individual who created/labeled the CAM record. If another user (e.g., attorney or pro se individual) using the AI model on a dispute receives that CAM as a response to inputs regarding a dispute, then an award can be paid to the attorney/individual who created the CAM. In some configurations this award can be paid by the user using the system, whereas in other configurations the award can be paid by a non-profit organization or other entity. In some configurations, any payments may be subject to management or other fees prior to distribution to the attorney/individual who created the CAM.

Once the system has multiple CAM records, those CAMs can be used to tune (train) the AI model. Preferably, systems configured as disclosed herein use a foundation/generative AI model that is trained on a large amount of data as the foundation or base for additional training on domain-specific data for use in that domain. Such foundation/generative AI models can be trained (tuned) using labeled data (such as CAM records) and then used to do natural language processing tasks such as classification and name-entity recognition. Natural language processing can include a sub-field of AI whose focus is to create AI models that can consume human language inputs and can provide human language outputs. An example is ChatGPT. Tuning the foundation/generative AI model using the CAMs can result in a tuned AI model, specifically tuned to the domain of information associated with the training CAMs.

To tune the foundation/generative AI model using the CAM(s), the system can run and/or execute the AI model using the CAM, then adjust the AI model's parameters to minimize the difference between the model's output and the actual labels of fields (e.g., the cause of action, the cause of action description, jurisdiction, etc.) within the CAM. This can be done using a method known as gradient descent.

The system can then evaluate the tuned AI model by using non-training data, allowing the system to test how well the new, updated AI model is performing. The system can repeat the fine-tuning step multiple times, with each iteration adjusting the model parameters (like learning rate, number of training epochs, etc.) to achieve the best results.

Once the AI model is tuned, a user (e.g., a pro se individual, an attorney, or other entity) can use the system to conduct a search. Instead of requiring the user to figure out what keyword(s) to search for, the system can receive one or more of the following as inputs from the user:

1) Text descriptions of the dispute
2) User description (e.g., user information and participant/party information including age and location)
3) Timelines (e.g., event description, event date, evidence description, evidence date);
4) Legal documents (e.g., contracts, notices, summons); and/or 6) Additional evidence (e.g., pictures, e-mails, transcriptions, etc.)

The system can then execute the tuned AI model, in the form of an AI algorithm, using those inputs. The AI algorithm can then output a list of potentially applicable CAMs. While the user interface can vary, in some configurations the user can then select, via a user interface, on one or more of the CAMs listed and read the details associated with each CAM. The CAM record can also contain a list of one or more similar cases (precedential and/or non-precedential) which show how judgment in prior cases has been determined for that cause of action.

In this manner, systems configured as disclosed herein provide entities, such as pro se individuals and other entities which cannot afford legal representation, the ability to pursue justice. Likewise, systems configured as disclosed herein can be used by practicing attorneys or other entities to quickly and efficiently accomplish issue spotting based on provided facts, identify relevant case law, and otherwise reduce user effort to filter dispute information.

In addition to the societal benefits of providing increased access to justice, such systems also provide an improvement in the technical efficiencies of searching legal records. Whereas previous systems rely on a knowledge of the keywords associated with the various causes of action, as well as knowledge of how to read statutes, identify relevant case law, etc. (i.e., legal training), users of the system disclosed herein can provide the specific facts of their dispute and be provided ideas (i.e., the outputs of the AI algorithm) which may assist them in identifying the issues in a dispute and potential causes of action.

FIG. 1 illustrates an example of creating Cause of Action Models (CAM), tuning an AI model based on those models, and executing the tuned AI model using dispute information. As illustrated Content Creators (such as, but not limited to, individuals who may or may not be attorneys) 102 create a CAM record identifying a cause of action for a given jurisdiction, and information associated with the cause of action (e.g., description, elements, relevant cases, etc.). The CAM record is added 104 to a CAM database 106. The CAM database 106 can be a computer system, such as a server, hard drive, cloud-based storage system, or any other electronic storage system. An existing AI model 120 is then tuned 108 using the CAM records within the CAM database 106, resulting in a tuned AI model 110.

Content consumers (such as attorneys, pro se individuals, or other users) 114 can then enter dispute information 116 into the system, which executes the tuned AI model 110 using the dispute information 116 as inputs, resulting in matched CAM records 112. That is, the tuned AI model 110 identifies one or more CAM records within the CAM database 106 which match (or are sufficiently similar to) one or more pieces of information provided within the dispute information, resulting in the matched CAM records 112. Those matched CAM records 112 can be provided to the content consumers 114. In some configurations, the content consumers 114 may pay or otherwise reward the content creator(s) 102 that created the matched CAM records 112 via a payment system 118. For example, if a content consumer 114 provides dispute information 116, and the result from the tuned AI model 110 is a matching CAM record 112, the content consumer 114 can pay (using the payment system 118) the content creator 102 who made the matching CAM record 112.

Figure 2:
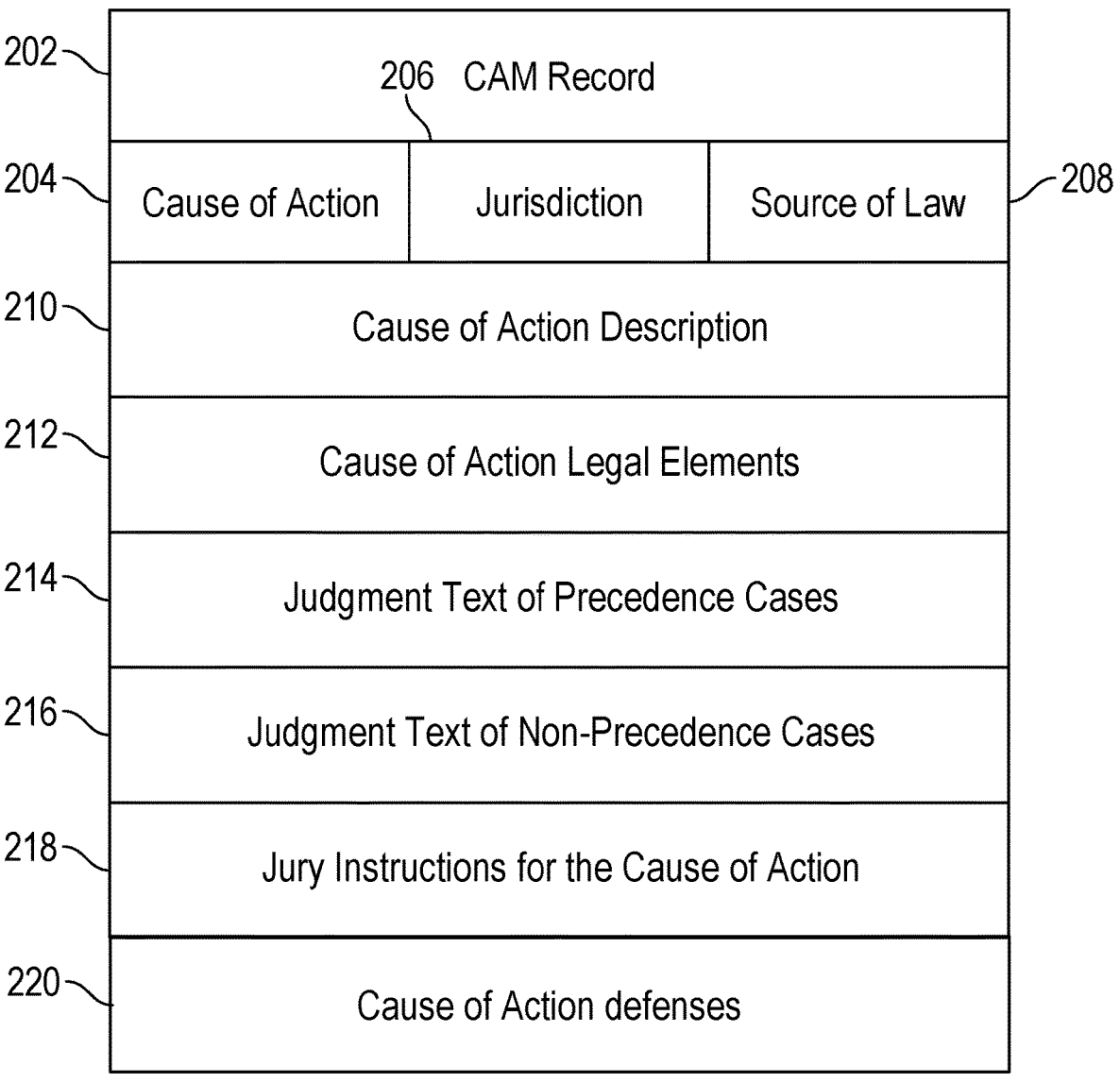
FIG. 2 illustrates an example of a CAM record.

FIG. 2 illustrates an example of a CAM record 202. Within the CAM record 202 are multiple different fields of data. In various configurations, additional or fewer fields may be present. In this example, the fields include: a name or title of a cause of action 204, the jurisdiction 206 for the cause of action, and a source of law 208. Additional fields can include a cause of action description 210 of the cause of action 204, cause of action legal elements 212 for the cause of action 204, judgment text (or a reference to) precedent cases 214, judgment text (or a reference to) non-precedent cases 216, jury instructions for the cause of action 218, and/or cause of action defenses 220.

Figure 3:
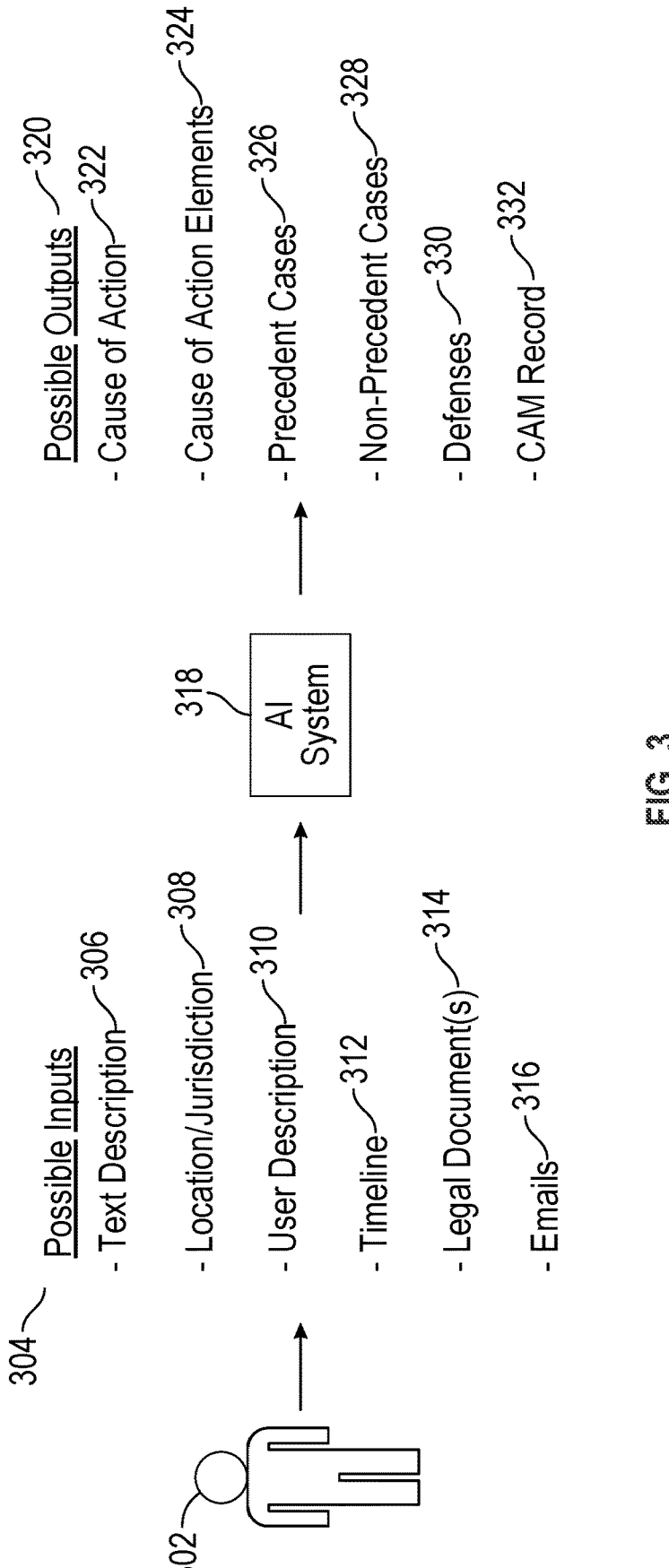
FIG. 3 illustrates an example of inputs and outputs to an AI system.

FIG. 3 illustrates an example of inputs 304 and outputs 320 to an AI system 318. Preferably, the AI system 318 is equivalent to the tuned AI model 110 of FIG. 1. As illustrated a user 302 (equivalent to a content consumer 114 in FIG. 1) provides inputs 304 to the AI system 318, and the AI system 318 outputs one or more CAM records. The inputs 304 can be dispute information 116, including a text description 306 regarding the dispute, a location/jurisdiction 308 of the dispute, a user description 310, a timeline 312, any legal documents 314, and or any emails 316 or other records associated with the dispute. The AI system 318 can then output 320 one or more CAM records or pieces thereof, which can include information such as (but not limited to) a name of the cause of action 322, cause of action elements 324, precedent cases 326, non-precedent cases 328, defenses 330 (e.g., procedural defenses, affirmative defenses, and/or statutory defenses), and/or an entire CAM record 332.

Figure 4:
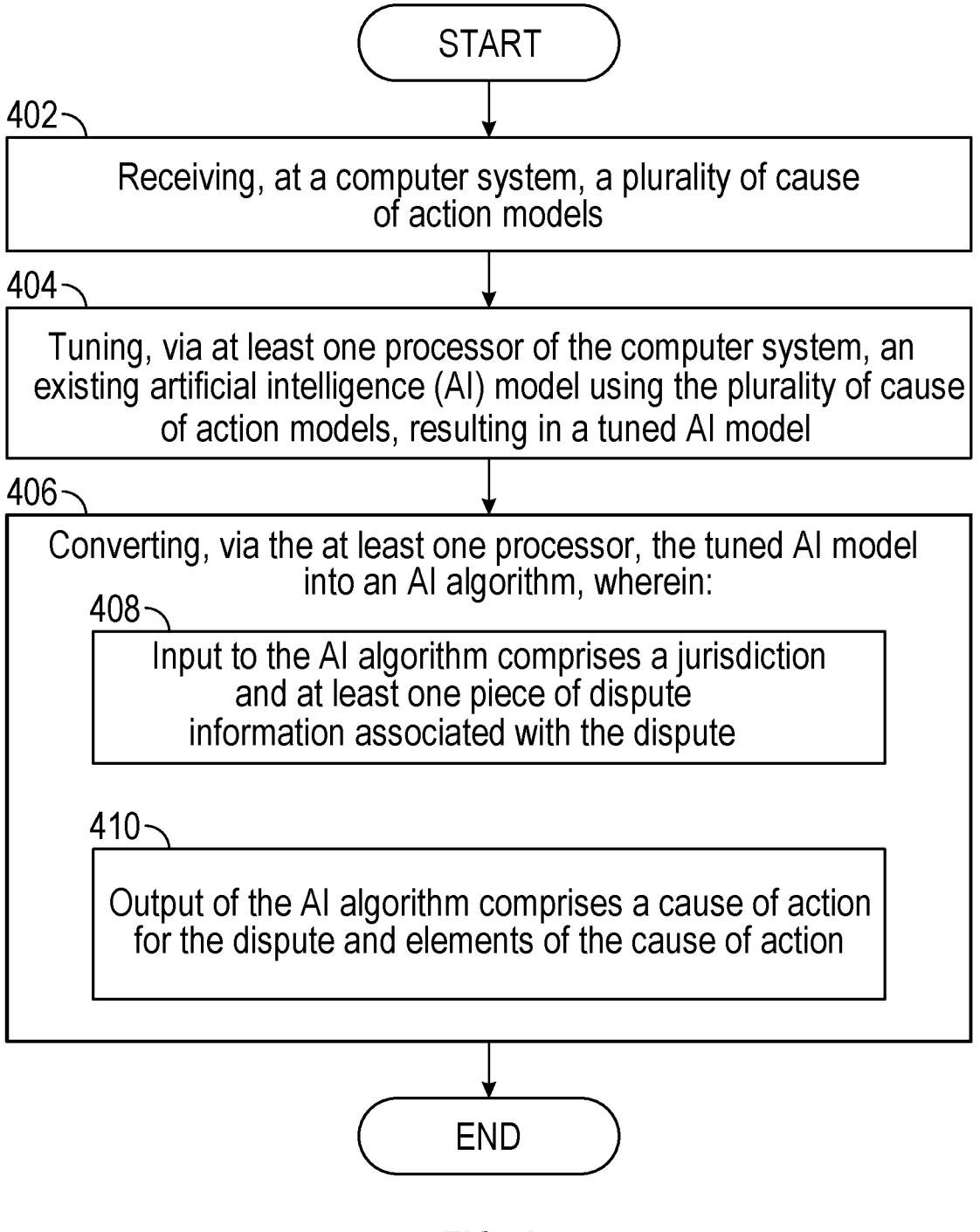
FIG. 4 illustrates an example method embodiment.

FIG. 4 illustrates an example method embodiment. computer system configured as described herein can receive a plurality of cause of action models (402). The system can then tune, via at least one processor of the computer system, an existing artificial intelligence (AI) model using the plurality of cause of action models, resulting in a tuned AI model (404). The system can then convert, via the at least one processor, the tuned AI model into an AI algorithm (406), wherein: input to the AI algorithm comprises a jurisdiction and at least one piece of dispute information associated with the dispute (408) and output of the AI algorithm comprises a cause of action for the dispute and elements of the cause of action (410). In some configurations, the output by the AI algorithm (the cause of action for the dispute and the associated elements of the cause of action which are output (410)) can be a CAM record, or part of a CAM record.

In some configurations, the input to the AI algorithm can further comprise a location of the dispute.

In some configurations, the illustrated method may be augmented to include: receiving, at the computer system, input information about a specific party involved in a specific dispute, the input information comprising: a location of the specific party; and at least one piece of dispute information associated with the specific party; executing, via the at least one processor, the AI algorithm wherein: inputs to the AI algorithm comprise the input information; and outputs of the AI algorithm comprise a cause of action for the specific dispute and the elements of the cause of action for the specific dispute; and transmitting, from the computer system to a user computing device, the outputs.

In some configurations, each cause of action model within the plurality of cause of action models can include: a name of a cause of action; a jurisdiction of the cause of action; a text description of the cause of action; and at least one legal element of the cause of action. In such configurations, each cause of action model within the plurality of cause of action models can further include: text of at least one previous legal case associated with the cause of action, the at least one previous legal case having been decided within the jurisdiction; and text of jury instructions provided to a jury for the at least one previous legal case associated with the cause of action. Moreover, the at least one previous legal case can include: at least one precedential case; and at least one non-precedential case. In addition, each cause of action model can further include at least one of a legal precedent (such as a Supreme Court decision which is precedent but is not a decided precedential case) or a statutory authority, wherein the at least one legal element of the cause of action is provided by the at least one of a legal precedent or the statutory authority.

In some configurations, the plurality of cause of action models can be generated using crowdsourcing by one or more additional users. In such configurations, upon the AI algorithm identifying the cause of action, an identity of an additional user can be identified, wherein the additional user generated the cause of action model associated with the cause of action. Moreover, the additional user can receive a payment based on usage of the cause of action model associated with the cause of action.

Figure 5:
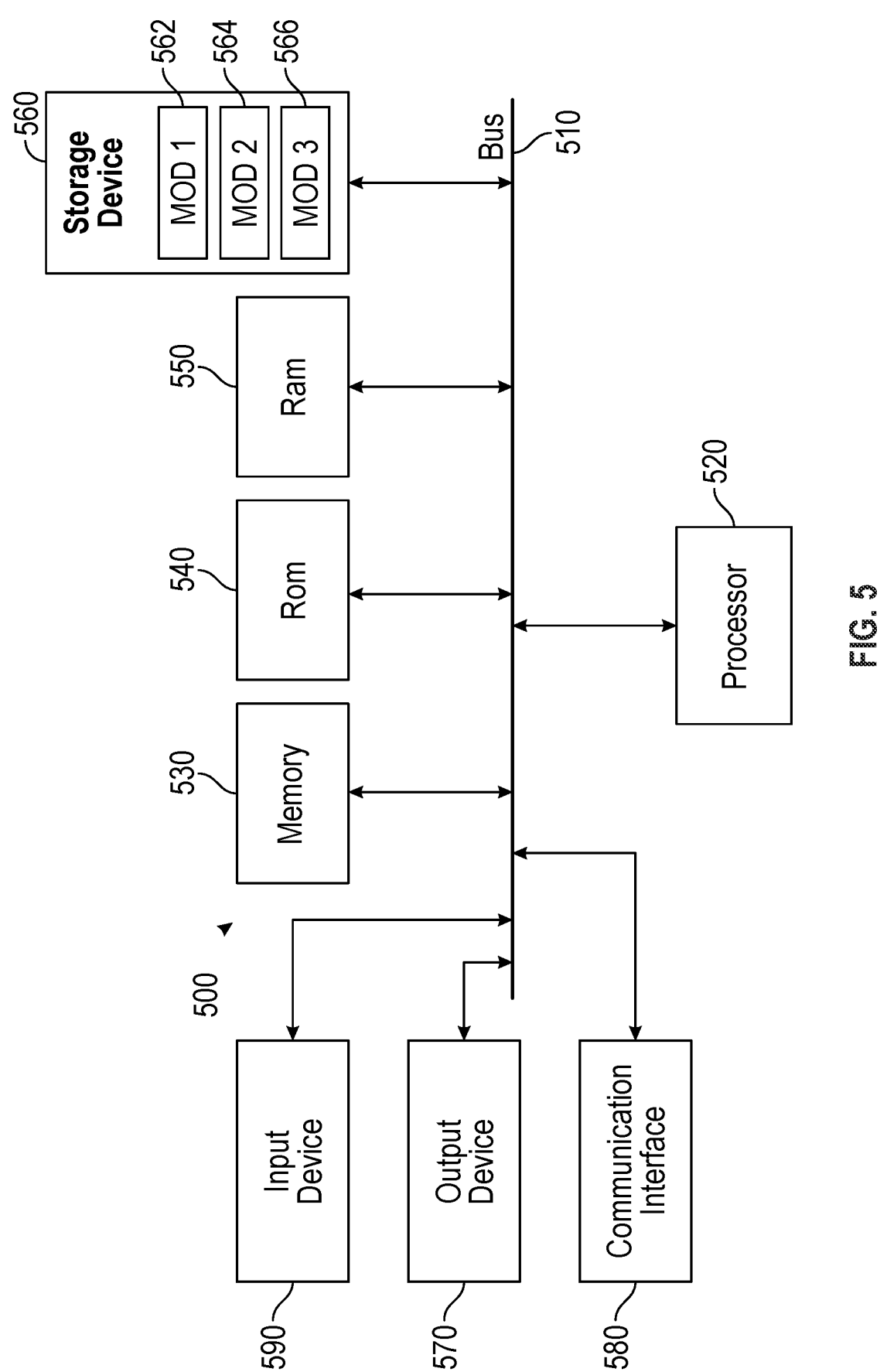
FIG. 5 illustrates an example computer system.

With reference to FIG. 5, an exemplary system includes a computing device 500 (such as a general-purpose computing device), including a processing unit (CPU or processor) 520 and a system bus 510 that couples various system components including the system memory 530 such as read-only memory (ROM) 540 and random access memory (RAM) 550 to the processor 520. The computing device 500 can include a cache of high-speed memory connected directly with, in close proximity to, or integrated as part of the processor 520. The computing device 500 copies data from the system memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The system memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general-purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in memory ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, system bus 510, output device 570 (such as a display or speaker), and so forth, to carry out the function. In another aspect, the system can use a processor and computer-readable storage medium to store instructions which, when executed by a processor (e.g., one or more processors), cause the processor to perform a method or other specific actions. The basic components and appropriate variations are contemplated depending on the type of device, such as whether the computing device 500 is a small, handheld computing device, a desktop computer, or a computer server.

Although the exemplary embodiment described herein employs the storage device 560 (such as a hard disk), other types of computer-readable media which can store data that are accessible by a computer, such as magnetic cassettes, flash memory cards, digital versatile disks, cartridges, random access memories (RAMs) 550, and read-only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per sc.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

The technology discussed herein refers to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. For example, unless otherwise explicitly indicated, the steps of a process or method may be performed in an order other than the example embodiments discussed above. Likewise, unless otherwise indicated, various components may be omitted, substituted, or arranged in a configuration other than the example embodiments discussed above.

Further aspects of the present disclosure are provided by the subject matter of the following clauses.

A method comprising: receiving, at a computer system, a plurality of cause of action models; tuning, via at least one processor of the computer system, an existing artificial intelligence (AI) model using the plurality of cause of action models, resulting in a tuned AI model; and converting, via the at least one processor, the tuned AI model into an AI algorithm, wherein: input to the AI algorithm comprises a jurisdiction and at least one piece of dispute information associated with a dispute, and; output of the AI algorithm comprises a cause of action for the dispute and elements of the cause of action.

The method of any preceding clause, wherein the input to the AI algorithm further comprises a location of the dispute.

The method of any preceding clause, further comprising: receiving, at the computer system, input information about a specific party involved in a specific dispute, the input information comprising: a location of the specific party; and at least one piece of dispute information associated with the specific party; executing, via the at least one processor, the AI algorithm wherein: inputs to the AI algorithm comprise the input information; and outputs of the AI algorithm comprise a cause of action for the specific dispute and the elements of the cause of action for the specific dispute; and transmitting, from the computer system to a user computing device, the outputs.

The method of any preceding clause, wherein each cause of action model within the plurality of cause of action models comprises: a name of a cause of action; a jurisdiction of the cause of action; a text description of the cause of action; and at least one legal element of the cause of action.

The method of any preceding clause, wherein each cause of action model within the plurality of cause of action models further comprises: text of at least one previous legal case associated with the cause of action, the at least one previous legal case having been decided within the jurisdiction; and text of jury instructions associated with the cause of action.

The method of any preceding clause, wherein the at least one previous legal case comprises: at least one precedential case; and at least one non-precedential case.

The method of any preceding clause, wherein each cause of action model within the plurality of cause of action models further comprises: at least one of a legal precedent or a statutory authority, wherein the at least one legal element of the cause of action is provided by the at least one of a legal precedent or the statutory authority.

The method of any preceding clause, wherein the plurality of cause of action models are generated using crowdsourcing by one or more additional users.

The method of any preceding clause, wherein, upon the AI algorithm identifying the cause of action, an identity of an additional user is identified, wherein the additional user generated the cause of action model associated with the cause of action.

The method of any preceding clause, wherein the computer system monetizes a service based on usage of the cause of action model.

A system comprising: at least one processor; and a non-transitory computer-readable storage medium having instructions stored which, when executed by the at least one processor, cause the at least one processor to perform operations comprising: receiving a plurality of cause of action models; tuning an existing artificial intelligence (AI) model using the plurality of cause of action models, resulting in a tuned AI model; and converting the tuned AI model into an AI algorithm, wherein: input to the AI algorithm comprises a jurisdiction and at least one piece of dispute information associated with a dispute; and output of the AI algorithm comprises a cause of action for the dispute and elements of the cause of action.

The system of any preceding clause, wherein the input to the AI algorithm further comprises a location of the dispute.

The system of any preceding clause, the non-transitory computer-readable storage medium having additional instructions stored which, when executed by the at least one processor, cause the at least one processor to perform operations comprising: receiving input information about a specific party involved in a specific dispute, the input information comprising: a location of the specific party; and at least one piece of dispute information associated with the specific party; executing the AI algorithm wherein: inputs to the AI algorithm comprise the input information; and outputs of the AI algorithm comprise a cause of action for the specific dispute and the elements of the cause of action for the specific dispute; and transmitting, to a user computing device, the outputs.

The system of any preceding clause, wherein each cause of action model within the plurality of cause of action models comprises: a name of a cause of action; a jurisdiction of the cause of action; a text description of the cause of action; and at least one legal element of the cause of action.

The system of any preceding clause, wherein each cause of action model within the plurality of cause of action models further comprises: text of at least one previous legal case associated with the cause of action, the at least one previous legal case having been decided within the jurisdiction; and text of jury instructions associated with the cause of action.

The system of any preceding clause, wherein the at least one previous legal case comprises: at least one precedential case; and at least one non-precedential case.

The system of any preceding clause, wherein each cause of action model within the plurality of cause of action models further comprises: at least one of a legal precedent or a statutory authority, wherein the at least one legal element of the cause of action is provided by the at least one of a legal precedent or the statutory authority.

The system of any preceding clause, wherein the plurality of cause of action models are generated using crowdsourcing by one or more additional users.

The system of any preceding clause, wherein, upon the AI algorithm identifying the cause of action, an identity of an additional user is identified, wherein the additional user generated the cause of action model associated with the cause of action.

A non-transitory computer-readable storage medium having instructions stored which, when executed by at least one processor, cause the at least one processor to perform operations comprising: receiving a plurality of cause of action models; tuning an existing artificial intelligence (AI) model using the plurality of cause of action models, resulting in a tuned AI model; and converting the tuned AI model into an AI algorithm, wherein: input to the AI algorithm comprises a jurisdiction and at least one piece of dispute information associated with a dispute; and output of the AI algorithm comprises a cause of action for the dispute and elements of the cause of action.

We claim:

1. A method comprising:

training a general use generative Artificial Intelligence (AI) model, the general use generative AI model configured to receive input text and output generative text;

receiving, at a computer system, a plurality of cause of action records, each record in the cause of action records recording aspects of a historical legal event and containing a cause of action description of the historical legal event;

executing, via at least one processor of the computer system for each cause of action record in the plurality of cause of action records, a machine-executed search of one or more legal data sources associated with an individual cause of action, resulting in jurisdictional rules for each cause of action record in the plurality of cause of action records;

preparing, via the at least one processor using the jurisdictional rules, a plurality of cause of action models, wherein each cause of action model in the plurality of cause of action models comprises a cause of action record in the plurality of cause of action records modified according to the jurisdictional rules;

tuning, via at least one processor of the computer system, the general use generative AI model using the plurality of cause of action models, resulting in a tuned legal AI model; and converting, via the at least one processor, the tuned legal AI model into an AI algorithm, wherein:

input to the AI algorithm comprises a jurisdiction and at least one piece of dispute information associated with a dispute; and output of the AI algorithm comprises a cause of action for the dispute and elements of the cause of action.

2. The method of claim 1, wherein each cause of action record within the plurality of cause of action records further comprises:

a name of a cause of action;

a jurisdiction of the cause of action; and at least one legal element of the cause of action.

3. The method of claim 2, wherein each cause of action record within the plurality of cause of action records further comprises:

text of at least one previous legal case associated with the cause of action, the at least one previous legal case having been decided within the jurisdiction; and text of jury instructions associated with the cause of action.

4. The method of claim 3, wherein the at least one previous legal case comprises at least two previous legal cases, the at least two previous legal cases comprising:

at least one precedential case; and at least one non-precedential case.

5. The method of claim 2, wherein each cause of action record within the plurality of cause of action records further comprises:

at least one of a legal precedent or a statutory authority, wherein the at least one legal element of the cause of action is provided by the at least one of a legal precedent or the statutory authority.

6. The method of claim 1, wherein the plurality of cause of action records are generated using crowdsourcing by one or more additional users, wherein each record in the plurality of cause of action records comprises:

a name of the cause of action;

a jurisdiction of the cause of action;

a text description of the cause of action;

at least one legal element of the cause of action;

text of at least two previous legal cases associated with the cause of action, the at least two previous legal cases having been decided within the jurisdiction, the at least two previous legal cases comprising:

at least one precedential case; and at least one non-precedential case;

text of jury instructions associated with the cause of action; and at least one defense of the cause of action.

7. The method of claim 6, wherein, upon the AI algorithm identifying the cause of action, an identity of a specific user is identified within the one or more additional users, wherein the specific user generated the cause of action record associated with the cause of action.

8. The method of claim 7, wherein the computer system pays the specific user based on usage of the cause of action record.

9. The method of claim 1, wherein the input to the AI algorithm further comprises a location of the dispute; and wherein the output of the AI algorithm further comprises at least one previously decided case, the at least one previously decided case identifying a basis for judgment in the at least one previously decided case was determined, the judgment relying on the cause of action for the dispute.

10. The method of claim 1, further comprising:

receiving, at the computer system, input information about a specific party involved in a specific dispute, the input information comprising:

a location of the specific party;

at least one piece of evidence, the at least one piece of evidence comprising one or more of: a picture, an email, or a transcription; and at least one piece of dispute information associated with the specific party;

executing, via the at least one processor, the AI algorithm wherein:

inputs to the AI algorithm comprise the input information; and outputs of the AI algorithm comprise a cause of action for the specific dispute and the elements of the cause of action for the specific dispute; and transmitting, from the computer system to a user computing device, the outputs.

11. A system comprising:

at least one processor; and a non-transitory computer-readable storage medium having instructions stored which, when executed by the at least one processor, cause the at least one processor to perform operations comprising:

training a general use generative Artificial Intelligence (AI) model, the general use generative AI model configured to receive input text and output generative text;

receiving a plurality of cause of action records, each record in the cause of action records recording aspects of a historical legal event and containing a cause of action description of the historical legal event;

executing, for each cause of action record in the plurality of cause of action records, a machine-executed search of one or more legal data sources associated with an individual cause of action, resulting in jurisdictional rules for each cause of action record in the plurality of cause of action records;

preparing, using the jurisdictional rules, a plurality of cause of action models, wherein each cause of action model in the plurality of cause of action models comprises a cause of action record in the plurality of cause of action records modified according to the jurisdictional rules;

tuning the general use generative AI model using the plurality of cause of action models, resulting in a tuned legal AI model; and converting the tuned legal AI model into an AI algorithm, wherein:

input to the AI algorithm comprises a jurisdiction and at least one piece of dispute information associated with a dispute; and output of the AI algorithm comprises a cause of action for the dispute and elements of the cause of action.

12. The system of claim 11, wherein each cause of action record within the plurality of cause of action records further comprises:

a name of a cause of action;

a jurisdiction of the cause of action; and at least one legal element of the cause of action.

13. The system of claim 12, wherein each cause of action record within the plurality of cause of action records further comprises:

text of at least one previous legal case associated with the cause of action, the at least one previous legal case having been decided within the jurisdiction; and text of jury instructions associated with the cause of action.

14. The system of claim 13, wherein the at least one previous legal case comprises at least two previous legal cases, the at least two previous legal cases comprising:

at least one precedential case; and at least one non-precedential case.

15. The system of claim 14, wherein each cause of action record within the plurality of cause of action records further comprises:

at least one of a legal precedent or a statutory authority, wherein the at least one legal element of the cause of action is provided by the at least one of a legal precedent or the statutory authority.

16. The system of claim 11, wherein the plurality of cause of action records are generated using crowdsourcing by one or more additional users, wherein each record in the plurality of cause of action records comprises:

a name of the cause of action;

a jurisdiction of the cause of action;

a text description of the cause of action;

at least one legal element of the cause of action;

text of at least two previous legal cases associated with the cause of action, the at least two previous legal cases having been decided within the jurisdiction, the at least two previous legal cases comprising:

at least one precedential case; and at least one non-precedential case;

text of jury instructions associated with the cause of action; and at least one defense of the cause of action.

17. The system of claim 16, wherein, upon the AI algorithm identifying the cause of action, an identity of a specific user within the one or more additional users is identified, wherein the specific user generated the cause of action record associated with the cause of action.

18. The system of claim 11, wherein the input to the AI algorithm further comprises a location of the dispute.

19. The system of claim 11, the non-transitory computer-readable storage medium having additional instructions stored which, when executed by the at least one processor, cause the at least one processor to perform operations comprising:

receiving input information about a specific party involved in a specific dispute, the input information comprising:

a location of the specific party;

at least one piece of evidence, the at least one piece of evidence comprising one or more of: a picture, an email, or a transcription; and at least one piece of dispute information associated with the specific party;

executing the AI algorithm wherein:

inputs to the AI algorithm comprise the input information; and outputs of the AI algorithm comprise a cause of action for the specific dispute and the elements of the cause of action for the specific dispute; and transmitting, to a user computing device, the outputs.

20. A non-transitory computer-readable storage medium having instructions stored which, when executed by at least one processor, cause the at least one processor to perform operations comprising:

training a general use generative Artificial Intelligence (AI) model, the general use generative AI model configured to receive input text and output generative text;

receiving a plurality of cause of action records, each record in the cause of action records recording aspects of a historical legal event and containing a cause of action description of the historical legal event;

executing, for each cause of action record in the plurality of cause of action records, a machine-executed search of one or more legal data sources associated with an individual cause of action, resulting in jurisdictional rules for each cause of action record in the plurality of cause of action records;

preparing, using the jurisdictional rules, a plurality of cause of action models, wherein each cause of action model in the plurality of cause of action models comprises a cause of action record in the plurality of cause of action records modified according to the jurisdictional rules;

tuning the general use generative AI model using the plurality of cause of action models, resulting in a tuned legal AI model; and converting the tuned AI model into an AI algorithm, wherein:

input to the AI algorithm comprises a jurisdiction and at least one piece of dispute information associated with a dispute; and output of the AI algorithm comprises a cause of action for the dispute and elements of the cause of action.

* * * * *